United States Patent
Sun et al.

(10) Patent No.: US 12,010,523 B2
(45) Date of Patent: Jun. 11, 2024

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Chen Sun, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 320 days.

(21) Appl. No.: 17/427,097

(22) PCT Filed: Mar. 5, 2020

(86) PCT No.: PCT/CN2020/077997
§ 371 (c)(1),
(2) Date: Jul. 30, 2021

(87) PCT Pub. No.: WO2020/182053
PCT Pub. Date: Sep. 17, 2020

(65) Prior Publication Data
US 2022/0132321 A1    Apr. 28, 2022

(30) Foreign Application Priority Data

Mar. 11, 2019    (CN) .......................... 201910180181.3

(51) Int. Cl.
   *H04W 56/00*    (2009.01)
   *H04W 16/14*    (2009.01)
(52) U.S. Cl.
   CPC .................. *H04W 16/14* (2013.01)
(58) Field of Classification Search
   CPC .................................................... H04W 16/14
(Continued)

(56) References Cited

U.S. PATENT DOCUMENTS

2015/0373554 A1* 12/2015 Freda ............... H04W 16/14
                                                                              455/450
2020/0288324 A1* 9/2020 Ford ................. H04W 16/10

FOREIGN PATENT DOCUMENTS

CN        104349328 A    2/2015
CN        104427509 A    3/2015
(Continued)

OTHER PUBLICATIONS

International Search Report and Written Opinion dated May 27, 2020, received for PCT Application PCT/CN2020/077997, Filed on Mar. 5, 2020, 9 pages including English Translation.

*Primary Examiner* — Sai Ming Chan
(74) *Attorney, Agent, or Firm* — XSENSUS LLP

(57) ABSTRACT

The present invention provides an electronic device and method for wireless communication, and a computer readable storage medium. The electronic device comprises: a processing circuit configured to: on the basis of interference relationship information among subsystems in a specific area, determine a second subsystem in a second coexistence group having an interference relationship with a first subsystem in a first coexistence group, wherein the first coexistence group comprises subsystems managed by a first spectrum management apparatus, and the second coexistence group comprises subsystems managed by a second spectrum management apparatus; and generate a spectrum coordination request to provide same to the second spectrum management apparatus, the spectrum coordination request indicating that the first spectrum management apparatus expects to use spectrum resources in coordination with the second spectrum management apparatus.

19 Claims, 6 Drawing Sheets

(58) Field of Classification Search
USPC .......................................................... 370/328
See application file for complete search history.

(56) References Cited

FOREIGN PATENT DOCUMENTS

| | | |
|---|---|---|
| CN | 106304099 A | 1/2017 |
| CN | 107371165 A | 11/2017 |
| CN | 108307395 A | 7/2018 |
| CN | 109041066 A | 12/2018 |
| JP | 2015195597 A | 11/2015 |
| JP | 2015233330 A | 12/2015 |

\* cited by examiner

ELECTRONIC DEVICE AND METHOD FOR WIRELESS COMMUNICATION, AND COMPUTER READABLE STORAGE MEDIUM

CROSS-REFERENCE TO RELATED APPLICATIONS

This application is based on PCT filing PCT/CN2020/077997, filed Mar. 5, 2020, which claims the priority to Chinese Patent Application No. 201910180181.3, titled "ELECTRONIC DEVICE AND METHOD FOR WIRELESS COMMUNICATION, AND COMPUTER READABLE STORAGE MEDIUM", filed on Mar. 11, 2019 with the China National Intellectual Property Administration, which is incorporated herein by reference in its entirety.

FIELD

The present disclosure relates to the technical field of wireless communications, and in particular to spectrum resources allocation for a secondary system in a scenario where a primary system and the secondary system coexist. More particularly, the present disclosure relates to an electronic apparatus and a method for wireless communications, and a computer-readable storage medium.

BACKGROUND

With the development of wireless communication technology, users have increasingly high demands for services with high quality, high speed and new features. Wireless communication operators and apparatus provider are required to continuously improve the system to meet users' demands. Therefore, a great amount of spectrum resources (which may be quantified by parameters such as time, a frequency, a bandwidth, an allowable maximum emitting power) are required to support new services and meet demands for high-speed communication. However, limited spectrum resources have been allocated to fixed operators and services, and new available spectrum is quite rare or costly. In this case, a concept of dynamic spectrum utilization is proposed. That is, spectrum resources that are allocated to certain services but are not fully utilized are utilized dynamically. For example, spectrum of a channel on which there is no program or spectrum of a channel adjacent to the channel on which there is no program on a digital television broadcast spectrum may be dynamically utilized to perform wireless mobile communication, without interfering with reception of a television signal.

In this example, since the television broadcast spectrum itself is allocated to the television broadcast system, the television broadcast system is a primary system and a television is a primary user. A mobile communication system is a secondary system and a receiver in the mobile communication system is a secondary user. Herein, the primary system may refer to a system having license to utilize a spectrum, for example, the television broadcast system. The secondary system refers to a system that has no license to utilize the spectrum, and only appropriately utilizes the spectrum allocated to the primary system when the primary system does not utilize the spectrum. In addition, the primary system and the secondary system each may have the license to utilize the spectrum, but have different priority levels in utilizing the spectrum. For example, when the operator deploys a new base station to provide a new service, an existing base station and a service provided by the existing base station have priority in utilizing the spectrum.

For such a communication manner in which the primary system and the secondary system coexist, it is required that utilization by the secondary system has no adverse effect on utilization by the primary system. Alternatively, influence resulted from the secondary system utilizing the spectrum can be controlled within an allowable range of the primary system. In case of multiple secondary systems, aggregated interferences resulted from these secondary systems cannot exceed an allowable interference upper limit of the primary system.

A spectrum management device may be used to manage the utilization of spectrum resources by the secondary systems, to ensure that communication of the primary system is not affected. On the other hand, it is also desired that a management strategy adopted by the spectrum management device can improve the utilization efficiency of spectrum resources as much as possible.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry, configured to: determine, based on information of interference relationship among secondary systems within a specific region, a second secondary system in a second coexistence group which has an interference relationship with a first secondary system in a first coexistence group, the first coexistence group including secondary systems managed by a first spectrum management device, and the second coexistence group including secondary systems managed by a second spectrum management device; and generate a spectrum coordination request to be provided to the second spectrum management device, the spectrum coordination request indicating that the first spectrum management device expects to coordinate utilization of spectrum resources with the second spectrum management device.

A method for wireless communications is provided according to another aspect of the present disclosure. The method includes: determining, based on information of interference relationship among secondary systems within a specific region, a second secondary system in a second coexistence group which has an interference relationship with a first secondary system in a first coexistence group, the first coexistence group including secondary systems managed by a first spectrum management device, and the second coexistence group including secondary systems managed by a second spectrum management device; and generating a spectrum coordination request to be provided to the second spectrum management device, the spectrum coordination request indicating that the first spectrum management device expects to coordinate utilization of spectrum resources with the second spectrum management device.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and the method according to the present disclosure, utilization of spectrum resources are coordinated between different spectrum management devices, thereby effectively improving spectrum utilization efficiency.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, in a scenario where a primary system and a secondary system coexist, a spectrum management device (or a central management device) may be provided to manage utilization of spectrum resources by the secondary systems within a management region of the spectrum management device. The spectrum management device allocates available spectrum resources among secondary systems reasonably so as to ensure efficiency and fairness of resource utilization and ensure that communication of the primary system is not adversely affected due to utilization of resources by the secondary systems.

A spectrum access system (SAS) for citizens broadband radio service (CBRS) serves as an example of the spectrum management device. Main functional entities in the CBRS include a citizens broadband radio service device (CBSD) and an end user device (EUD). Functional entities for spectrum management may include, for example, the SAS, a spectrum management database (SMD), a group spectrum coordinator (GSC), a coexistence manager (CxM) or the like. The following description may be given with the spectrum access system as an example, but it is only for ease of understanding, and the applicable scope of the embodiments of the present disclosure is not limited thereto.

Figure 1:
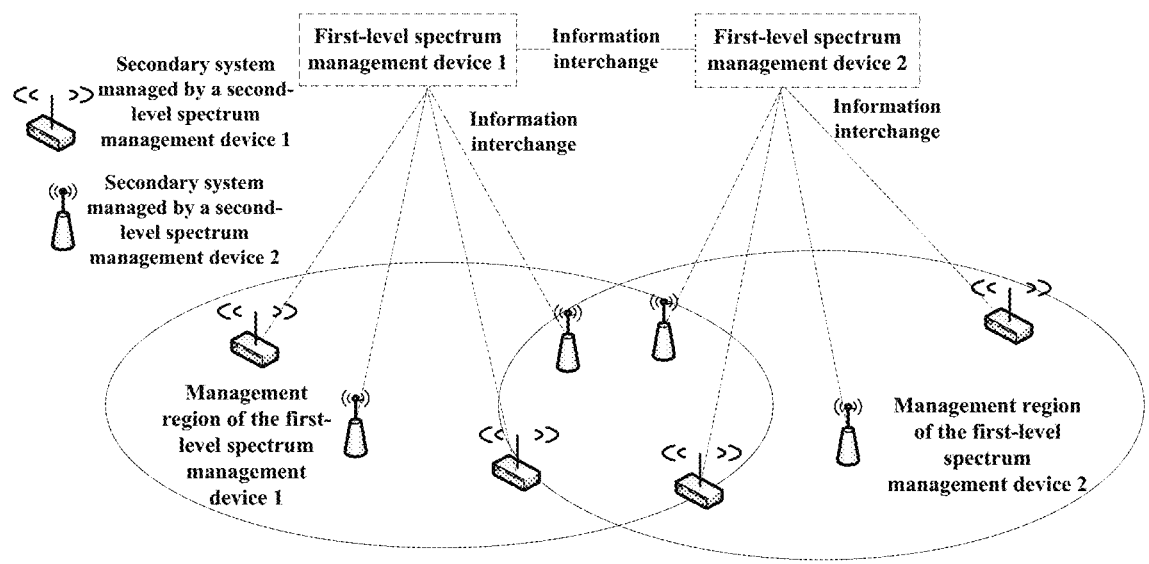
FIG. 1 is a diagram showing an example of spectrum management devices in different regions.

FIG. 1 is a diagram showing an example of spectrum management devices in different regions. There are two levels of spectrum management devices in the example shown in FIG. 1. A first-level spectrum management device determines spectrum resources available to a secondary system based on interferences to the primary system. The first-level spectrum management device is, for example, a functional module for spectrum resources allocation provided by a geographic location database operator authorized according to national laws and regulations. After the spectrum resources available to the secondary system are acquired, a second-level spectrum management device manages utilization of the spectrum resources by the secondary systems among spectrum resources available to the secondary systems. The second-level spectrum management device may be, for example, an operator, a network provider, or a network management organization in an office region or residential region. Secondary systems managed by the second-level spectrum management device form a coexistence group. The second-level spectrum management device allocates spectrum resources for the secondary systems in the coexistence group based on the acquired spectrum resources available to the secondary systems.

It can be seen that coverage ranges of some secondary systems in different coexistence groups may overlap with each other. That is, these secondary systems may interfere with each other. In order to prevent such interferences, the first-level spectrum management device is required to allocate orthogonal spectrum resources for the involved two coexistence groups. However, other secondary systems in the two coexistence groups actually do not interfere with each other. Therefore, according to an embodiment of the present disclosure, a solution for allocating (utilizing) spectrum resources which takes such difference into consideration is provided, in order to improve utilization efficiency of spectrum resources.

Figure 2:
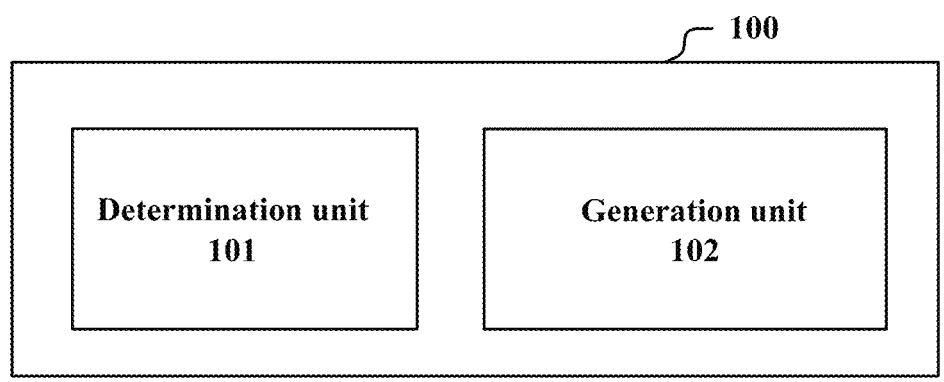
FIG. 2 is a block diagram showing functional modules of an electronic apparatus for wireless communications according to an embodiment of the present disclosure.

FIG. 2 is a block diagram showing functional modules of an electronic apparatus 100 for wireless communications according to an embodiment of the present disclosure. As shown in FIG. 2, the electronic apparatus 100 includes a determination unit 101 and a generation unit 102. The determination unit 101 is configured to determine, based on information of interference relationship among secondary systems within a specific region, a second secondary system in a second coexistence group which has an interference relationship with a first secondary system in a first coexistence group. The first coexistence group includes secondary systems managed by a first spectrum management device, and the second coexistence group includes secondary systems managed by a second spectrum management device. The generation unit 102 is configured to generate a spectrum coordination request to be provided to the second spectrum management device. The spectrum coordination request indicates that the first spectrum management device expects to coordinate utilization of spectrum resources with the second spectrum management device.

The determination unit 101 and the generation unit 102 may be implemented by one or more processing circuitries, which may be implemented, for example, as a chip or a processor. Moreover, it should be understood that various functional units in the electronic apparatus shown in FIG. 2 are only logical modules defined based on their specific functions, and are not intended to limit a specific implementation. This also applies to examples of other electronic apparatuses to be described later.

The electronic apparatus 100 may be arranged, for example, on a side of a spectrum management device (or central management device), or may be communicatively connected to the spectrum management device (or the central management device). In addition, the electronic apparatus 100 may be arranged on a side of a core network. The spectrum management device (or central management device) described herein may be implemented as various functional entities, such as the SAS, the CxM or the GSC in the above CBRS architecture. In the CBRS architecture, it may be arranged that the SAS implements a part of functions of the electronic apparatus 100, and the CxM implements another part of the functions of the electronic apparatus 100, and so on. It should be understood that these are not restrictive. Taking the scenario shown in FIG. 1 as an example, the electronic apparatus 100 may be arranged, for example, on a second-level spectrum management device.

It should further be noted that the electronic apparatus 100 may be implemented at a level of chip, or may be implemented at a level of apparatus. For example, the electronic apparatus 100 may function as the spectrum management device (or the central management device) itself, and may further include external devices such as a memory, a transceiver (not shown in the drawings). The memory may be configured to store programs executed by the spectrum management device (or central management device) for realizing various functions and related data information. The transceiver may include one or more communication interfaces to support communication with different devices (for example, a base station, another spectrum management device (or central management device), user equipment or the like). A specific implementation of the transceiver is not limited herein.

In addition, the first, the second and the like in various terms are only for distinguishing and for ease of description, and do not have any other meanings or indicate a sequence.

The specific region may be a management region covered by the first spectrum management device and the second spectrum management device, or a management region covered by another spectrum management device for allocating available spectrum resources. Here, the first spectrum management device and the second spectrum management device each is, for example, the second-level spectrum management device shown in FIG. 1. In an SAS system, the first spectrum management device and the second spectrum management device each is a CxM, for example. Another spectrum management device for allocating available spectrum resources is, for example, the first-level spectrum management device in FIG. 1, such as the SAS in the SAS system.

For example, information of interference relationship among secondary systems may be represented by an interference relationship map, in which each vertex represents a secondary system or a group of secondary systems. The secondary systems in the group are capable of withstanding interferences from each another or utilizing the same spectrum resources. Two vertices are connected by a line if secondary systems respectively represented by the two vertices interfere with each other. The spectrum management device constructs an interference relationship map based on interferences status among the secondary systems. For example, in the example shown in FIG. 1, the first-level spectrum management device constructs the interference relationship map mainly based on an overlapping relation between coverage ranges of the secondary systems. The second-level spectrum management device may utilize more detailed information when constructing the interference relationship map, to construct an interference relationship map more approximating the actual situation. Since second-level spectrum management devices may utilize different channel transmission models and/or interferences management strategies, different interference relationship maps may be constructed for the same set of secondary systems.

Based on the constructed interference relationship map, the determination unit 101 may determine a secondary system (referred to as a first secondary system) in a coexistence group (i.e., a first coexistence group) managed by the spectrum management device (i.e., a first spectrum management device) which has an interference relationship with a secondary system (referred to as a second secondary system) in a second coexistence group managed by a second spectrum management device.

The generation unit 102 generates the spectrum coordination request to be sent to the second spectrum management device, so that the second spectrum management device may, upon receipt of the spectrum coordination request, know that the first spectrum management device expects to coordinate utilization of spectrum resources with the second spectrum management device. The coordination includes, for example, ensuring that the first secondary system utilizes spectrum resources different from the spectrum resources utilized by the second secondary system.

It should be understood that the operations of the determination unit 101 and the generation unit 102 may be based on the fact that the first spectrum management device allows spectrum coordination. That is, the determination unit 101 and the generation unit 102 perform the above operations only when the first spectrum management device is under a state where the spectrum coordination is allowed.

The spectrum coordination request may include identification information of the first secondary system and identification information of the second secondary system. In addition, there may be a case of no first secondary system and no second secondary system. That is, the first spectrum management device considers that the first coexistence group and the second coexistence group do not interfere with each other. In this case, the generation unit 102 may generate no spectrum coordination request. Alternatively, the generation unit 102 may generate a spectrum coordination request in a specific format, for example, a spectrum coordination request that does not include identification information of any secondary system.

Further, the first spectrum management device and the second spectrum management device interchange information to confirm whether to perform spectrum coordination, that is, to confirm whether to coordinate spectrum resources allocation for the secondary systems in two coexistence groups interfering with each other, and to determine a manner of the coordination. It should be noted in the case of no first secondary system and no second secondary system, the first spectrum management device and the second spectrum management device may coordinate the utilization of spectrum resources as long as the first spectrum management device and the second spectrum management device are under the state where the spectrum coordination is allowed, without additional information interchange between the first spectrum management device and the second spectrum management device.

Figure 3:
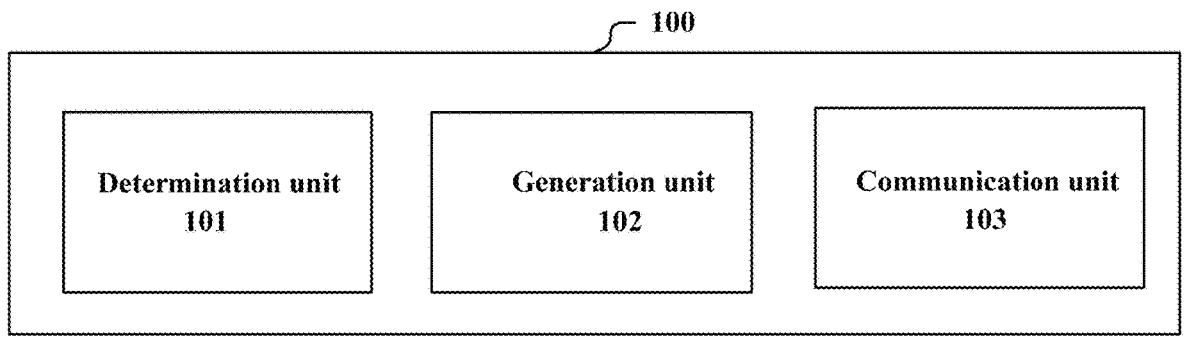
FIG. 3 is a block diagram showing functional modules of an electronic apparatus for wireless communications according to an embodiment of the present disclosure.

Accordingly, as shown in FIG. 3, the electronic apparatus 100 further includes a communication unit 103. The communication unit 103 is configured to transmit the spectrum coordination request to the second spectrum management device. In addition, the communication unit 103 is further configured to acquire, from the second spectrum management device, a response to the spectrum coordination request. The response may include, for example, one of the following: confirmation to the spectrum coordination request by the second spectrum management device, rejection to the spectrum coordination request by the second spectrum management device, and an additional setting to the spectrum coordination request by the second spectrum management device.

In the first example, the determination unit 101 is further configured to determine a manner in which the first spectrum management device and the second spectrum management device coordinate the utilization of spectrum resources. The manner in which the first spectrum management device and the second spectrum management device coordinate the utilization of the spectrum resources (hereinafter also referred to as the spectrum coordination manner) may include one of the following: the second spectrum management device adjusting spectrum resources allocation for the second secondary system based on information of spectrum resources allocation for the first secondary system; and first spectrum management device adjusting spectrum resources allocation for the first secondary system based on information of spectrum resources allocation for the second secondary system.

For example, the determination unit 101 may determine, based on a spectrum utilization freedom degree of the first secondary system, the manner of coordinating utilization of the spectrum resources that is to be adopted. The spectrum utilization freedom degree indicates a degree to which a secondary system is capable of freely selecting spectrum resources among the spectrum resources allocated to the coexistence group.

For example, the determination unit 101 may determine the spectrum utilization freedom degree of the first secondary system based on the interference relationship map. As an example, the spectrum utilization freedom degree of the first secondary system includes the number of manners for selecting spectrum resources which can be adopted by the first secondary system in a case that another secondary system in the first coexistence group utilizes the spectrum resources allocated to the first coexistence group.

Figure 4:
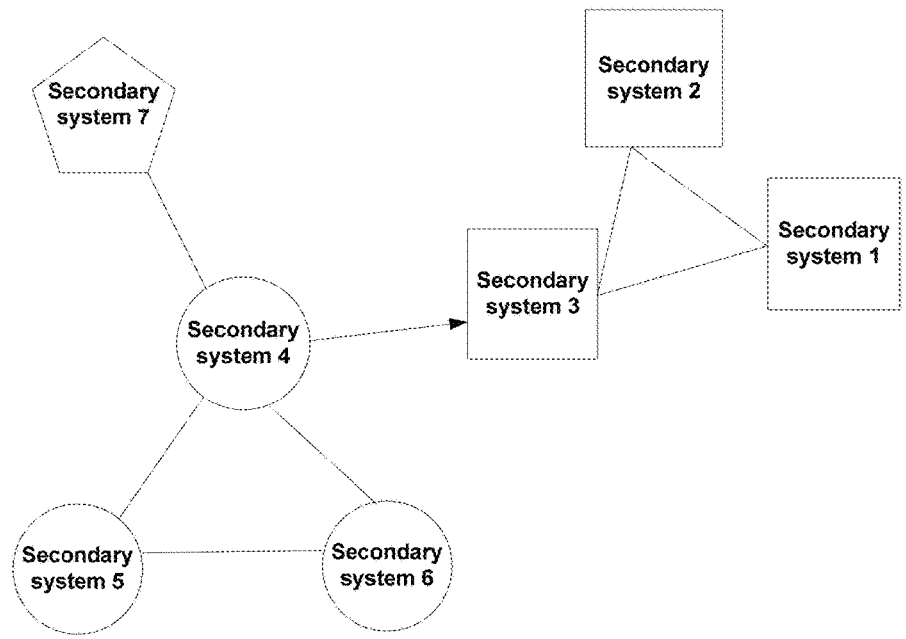
FIG. 4 shows an example of an interference relationship map constructed at a first-level spectrum management device.
Figure 5:
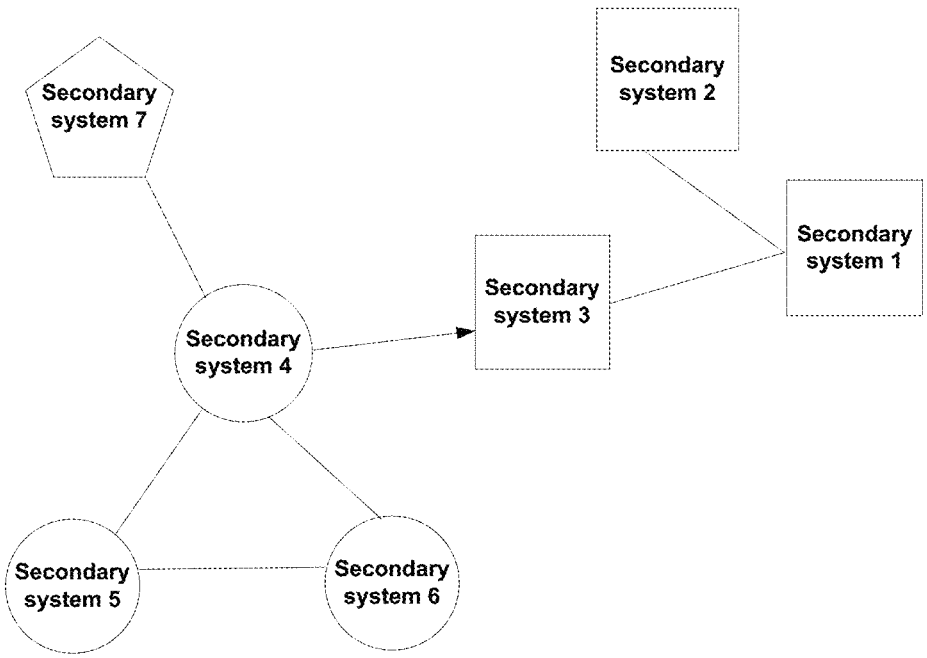
FIG. 5 shows an example of an interference relationship map constructed at a first spectrum management device.
Figure 6:
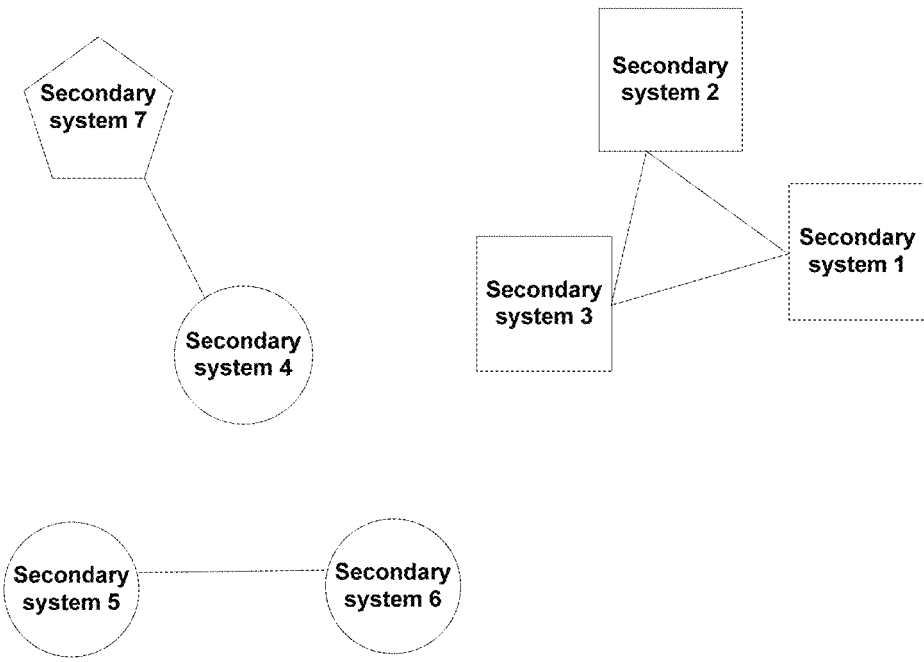
FIG. 6 shows an example of an interference relationship map constructed at a first second spectrum management device.

For ease of understanding, an example of coordination of spectrum resources utilization is given below. FIG. 4 shows an example of an interference relationship map constructed at a first-level spectrum management device. FIG. 5 and FIG. 6 show examples of an interference relationship map constructed at a first spectrum management device and at a second spectrum management device respectively. A line segment in the drawings indicates which secondary system the interferences each secondary system subjected to are from. A line segment with an arrow represents a direction of the interferences, and a line segment without an arrow indicates that there are interferences in both directions. The first coexistence group includes secondary systems 1, 2, and 3, the second coexistence group includes secondary systems 4, 5, and 6, and an independent secondary system 7 does not belong to any coexistence group.

At the first-level spectrum management device, for example, a graph coloring method may be used to allocate available spectrum resources for the secondary systems based on the interference relationship map. In the interference relationship map, a set of vertices representing secondary systems corresponding to the coexistence group is referred to as a coexistence set, and coexistence sets overlapping with each other form a connected set. For each coexistence set, a minimum chromatic number required for coloring the coexistence set is determined. A minimum chromatic number required for coloring an entire connected set is finally counted. The available spectrum resources are divided and allocated based on the minimum chromatic number as counted.

In the example shown in FIG. 4, the minimum chromatic number for each of the first coexistence group and the second coexistence group is 3, and the independent secondary system 7 may share the spectrum resources allocated for the first coexistence group. Therefore, a final minimum chromatic number is 6. It is assumed that there are available spectrum resources of 60 MHz (for example, from 3600 MHz to 3660 MHz), the spectrum resources of 60 MHz may be divided into 6 parts, namely, a channel 1 to a channel 6 each corresponding to 10 MHz. For example, channels 1 to 3 may be allocated to the first coexistence group, channels 4 to 6 may be allocated to the second coexistence group. The independent secondary system 7 may utilize any one of channels 1 to 3.

As shown in FIG. 5, based on the interference relationship map constructed by the first spectrum management device, a secondary system 3 is a first secondary system, and a secondary system 4 is a second secondary system. The first spectrum management device acquires three parts of available spectrum resources, namely the channel 1 to the channel 3. However, based on the interference relationship map in FIG. 5, the selection of spectrum resources for the first secondary system is restricted by secondary systems 1 and 2. When the secondary systems 1 and 2 utilize the allocated spectrum resources, for example, the secondary system 1 utilizes the channel 1 and the secondary system 2 utilizes the channel 2, the secondary system 3 may select the channel 3 or the channel 2, that is, a spectrum utilization freedom degree of the secondary system 3 is 2.

For example, the determination unit 101 may determine, in a case that the spectrum utilization freedom degree of the first secondary system is greater than a certain degree, that the first spectrum management device adjusts the spectrum resources allocation for the first secondary system based on the information of spectrum resources allocation for the second secondary system. On the other hand, the determination unit 101 may determine, in a case that the spectrum utilization freedom degree of the first secondary system is less than the certain degree, that the second spectrum management device adjusts the spectrum resources allocation for the second secondary system based on the information of spectrum resources allocation for the first secondary system. This is based on a fact that the greater the spectrum utilization freedom degree is, the greater the possibility of succeeding in adjustment of the spectrum resources allocation for the corresponding secondary system is. However, it should be understood that the determination manner is not limited to this. For example, a spectrum management device corresponding to a secondary system that causes interferences may be selected to adjust the spectrum resources allocation. Alternatively, the first spectrum management device or the second spectrum management device may be fixedly selected to adjust the spectrum resources allocation.

Besides the identification information of the first secondary system and the identification information of the second secondary system, the generation unit 102 also includes information of the spectrum coordination manner determined by the determination unit 101 into the spectrum coordination request, which is transmitted to the second spectrum management device by the communication unit 103.

Correspondingly, the second spectrum management device responds to the received spectrum coordination request. The second spectrum management device, when approving the spectrum coordination and approving the spectrum coordination manner in the spectrum coordination request, transits a response of confirmation. Subsequently, the first spectrum management device and the second spectrum management device coordinate the utilization of spectrum resources based on the spectrum coordination manner in the spectrum coordination request. On the other hand, the second spectrum management device, when not approving the spectrum coordination or not approving the coordination manner in the spectrum coordination request, transits a response of rejection.

Moreover, the second spectrum management device, when approving the spectrum coordination but not approving the coordination manner in the spectrum coordination request, may transit other settings. The other settings may include, for example, the spectrum utilization freedom degree of the second secondary system calculated by the second spectrum management device, so that the first spectrum management device may modify the spectrum coordination manner based on the other settings.

In a second example, the generation unit 102 further includes information of the spectrum utilization freedom degree of the first secondary system into the spectrum coordination request. In this example, the second spectrum management device may calculate the spectrum utilization freedom degree of the second secondary system in a similar way, compare the spectrum utilization freedom degree of the second secondary system with the received spectrum utilization freedom degree of the first secondary system, and determine the manner in which the first spectrum management device and the second spectrum management device coordinate the utilization of spectrum resources based on a comparison result. For example, a spectrum management device corresponding to a secondary system with a higher spectrum utilization freedom degree may be selected as the spectrum management device to adjust the spectrum resources allocation. That is, spectrum resources allocation for the secondary system with a higher spectrum utilization freedom degree is selected to be adjusted. In a case that the spectrum utilization freedom degree of the first secondary system is equal to the spectrum utilization freedom degree of the second secondary system, a spectrum management device corresponding to either secondary system can be randomly selected as the spectrum management device to adjust the spectrum resources allocation. Alternatively, a spectrum management device for adjusting the spectrum resources allocation can be selected based on a predetermined rule. For example, a spectrum management device corresponding to a secondary system that causes interferences is selected.

Subsequently, the second spectrum management device responds to the received spectrum coordination request. In a case that the second spectrum management device approves the spectrum coordination, the response may include confirmation to the spectrum coordination request. The confirmation includes, for example, setting of the spectrum coordination manner by the second spectrum management device. On the other hand, the second spectrum management device, if not approving the spectrum coordination, transits a response of rejection.

Still referring to examples shown in FIGS. 4 to 6. FIG. 6 shows an interference relationship map constructed by the second spectrum management device. In the example shown in FIG. 6, the first coexistence group and the second coexistence group do not interfere with each other. Upon receipt of the spectrum coordination request from the first spectrum management device, the second spectrum management device identifies a secondary system 4 is as the second secondary system and calculates a spectrum utilization freedom degree of the secondary system 4 as 3. That is, selection of the spectrum resources of the secondary system 4 is not affected no matter which spectrum resources are selected by the secondary systems 5 and 6, and the secondary system 4 may select any one of channels 4 to 6. The second spectrum management device compares the spectrum utilization freedom degree of the first secondary system of 2 with the spectrum utilization freedom degree of the second secondary system of 3, and selects a second spectrum management device corresponding to a second secondary system with a larger spectrum utilization freedom degree as the spectrum management device to perform the adjustment. Subsequently, the second spectrum management device includes a selection result into the response to the spectrum coordination request and transmits the response to the first spectrum management device. The first spectrum management device and the second spectrum management device coordinate the utilization of spectrum resources based on the spectrum coordination manner included in the response.

In addition, the generation unit 102 is further configured to: in a case that the first spectrum management device and the second spectrum management device determine to coordinate the utilization of spectrum resources, generate spectrum coordination information to be provided to a third spectrum management device (that is, the first-level spectrum management device) which is configured to allocate spectrum resources for secondary systems within a specific region, the spectrum coordination information indicating that the first spectrum management device and the second spectrum management device are to coordinate the utilization of spectrum resources. The communication unit 103 transmits the spectrum coordination information to the third spectrum management device. Alternatively, the second spectrum management device transmits the spectrum coordination information to the third spectrum management device.

Upon receipt of the spectrum coordination information, the third spectrum management device re-allocates the spectrum resources or adjusts the previous spectrum resources allocation, taking the first coexistence group and the second coexistence group as a virtual coexistence group.

Still taking FIG. 4 as an example, the third spectrum management device considers the first coexistence group and the second coexistence group as a virtual coexistence group, and determines a minimum chromatic number of the virtual coexistence group as 3. Since the independent secondary system 7 and the virtual coexistence group interfere with each other, an additional color needs to be assigned to the secondary system 7. A final minimum chromatic number is determined as 4. It should be understood that the smaller the minimum chromatic number is, the wider each part of spectrum resources obtained from division is. In this case, the available resources of 60 MHz may be divided into 4 parts, namely, a channel 1 to a channel 4 each corresponding to 15 MHz. Compared with the case where the first coexistence group and the second coexistence group do not coordinate spectrum resources allocation, a bandwidth of the channel is increased and the spectrum utilization efficiency is improved.

Alternatively, the third spectrum management device may keep the spectrum resources allocation for the independent secondary system unchanged, and only adjust the spectrum resources allocation for the coexistence group involved. In the example in FIG. 4, it is assumed that the channel 1 is allocated to the secondary system 7, bandwidths corresponding to channels 2 to 6 may be re-divided into 3 channels to be allocated to the first coexistence group and the second coexistence group, still obtaining a bandwidth of 15 MHz per channel.

In summary, in a case that the first spectrum management device and the second spectrum management device can coordinate the spectrum resources allocation so that the first coexistence group and the second coexistence group can be considered as a virtual coexistence group for spectrum resources allocation, the minimum chromatic number can be effectively reduced, thereby improving the spectrum utilization efficiency.

The communication unit 103 is configured to acquire, from the third spectrum management device, resources allocation information of the spectrum resources reallocated for the first coexistence group and the second coexistence group by the third spectrum management device based on the spectrum coordination information, and allocate spectrum resources for the secondary systems in the first coexistence group based on the resources allocation information.

Orthogonality of the spectrum resources allocation for secondary systems interfering with each other respectively in the two coexistence groups is guaranteed by the coordination between the first spectrum management device and the second spectrum management device. Therefore, information of the spectrum resources allocation of the first secondary system or the second secondary system is also required to be interchanged between the first spectrum management device and the second spectrum management device.

For example, in a case that the first spectrum management device adjusts, based on the information of spectrum resources allocation for the second secondary system, spectrum resources allocation for the first secondary system, the communication unit 103 is further configured to acquire, from the second spectrum management device, the information of spectrum resources allocation for the second secondary system. The first spectrum management device allocates spectrum resources for the secondary systems in the first coexistence group based on the information of spectrum resources allocation. Specifically, the first spectrum management device ensures that the first secondary system is allocated with spectrum resources orthogonal to the spectrum resources indicated by the information of the spectrum resources allocation for the second secondary system.

On the other hand, in a case that the second spectrum management device adjusts, based on information of spectrum resources allocation for the first secondary system, spectrum resources allocation for the second secondary system, the communication unit 103 is further configured to provide the information of spectrum resources allocation for the first secondary system to the second spectrum management device, so that the second spectrum management device allocates spectrum resources for the secondary system in the second coexistence group based on the information of spectrum resources allocation. Specifically, the second spectrum management device ensures that a second secondary system is allocated with spectrum resources orthogonal to the spectrum resources indicated by the information of spectrum resources allocation for the first secondary system.

In addition, the communication unit 103 is further configured to receive the spectrum coordination request sent from the second spectrum management device. In this case, the first spectrum management device correspondingly performs the operations performed by the second spectrum management device as described above.

For example, the generation unit 102 generates a response to the spectrum coordination request. In a case that the first spectrum management apparatus does not approve to coordinate spectrum resources allocation, the response may include rejection to the spectrum coordination request. Otherwise, the response may include confirmation to the spectrum coordination request.

In an example, the spectrum coordination request includes the identification information of the first secondary system and the identification information of the second secondary system that are determined by the second spectrum management device, and further includes a spectrum coordination manner determined by the second spectrum management device. In a case that the determination unit 101 determines that the first spectrum management device does not approve to coordinate the spectrum resources allocation, the generation unit 102 generates a response of rejection.

Otherwise, the determination unit 101, for example, may determine a spectrum utilization freedom degree of the first secondary system based on the constructed interference relationship map, and determines whether to approve the spectrum coordination manner determined by the second spectrum management device based on the spectrum utilization freedom degree. For example, in a case that the second spectrum management device determines that the first spectrum management device adjusts the spectrum resources allocation for the secondary systems and the determination unit 101 determines that the spectrum utilization freedom degree of the first secondary system is lower than a predetermined degree, the spectrum coordination request may be rejected or the second spectrum management device is required to adjust the spectrum resources allocation of the secondary systems. In the latter case, the response generated by the generation unit 102 may include additional settings for the spectrum coordination request, for example, the setting to the spectrum coordination manner. In addition, in a case that the determination unit 101 determines to approve the spectrum coordination manner in the spectrum coordination request, the generation unit 102 generates a response of agreement (that is, confirmation).

In another example, the spectrum coordination request includes the spectrum utilization freedom degree of the second secondary system determined by the second spectrum management device. In a case that the determination unit 101 determines that the first spectrum management device does not approve to coordinate spectrum resources allocation, the generation unit 102 generates a response of rejection. Otherwise, the determination unit 101 determines the spectrum utilization freedom degree of the first secondary system based on the constructed interference relationship map, compares the spectrum utilization freedom degree of the first secondary system with the spectrum utilization freedom degree of the second secondary system, and determines, based on a comparison result, the manner in which the first spectrum management device and the second spectrum management device coordinate the utilization of spectrum resources. As mentioned above, the determination unit 101 may select a spectrum management device corresponding to a secondary system with a higher spectrum utilization freedom degree as the spectrum management device to adjust the spectrum resources allocation. Particularly, in a case that the spectrum utilization freedom degrees of the two secondary systems are equal, the determination unit 101 may randomly select a spectrum management device corresponding to either secondary system, or select a spectrum management device based on a predetermined rule. For example, the determination unit 101 selects a spectrum management device corresponding to a secondary system that causes interferences, or the like.

In this example, the response generated by the generation unit 102 may include information of the setting of the spectrum coordination manner, that is, include the information of the spectrum coordination manner determined by the determination unit 101.

The communication unit 103 transmits the response to the spectrum coordination request generated by the generation unit 102 to the second spectrum management device.

In summary, the electronic apparatus 100 according to this embodiment can coordinate utilization of spectrum resources between two spectrum management devices, thereby improving spectrum utilization efficiency.

Second Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 7:
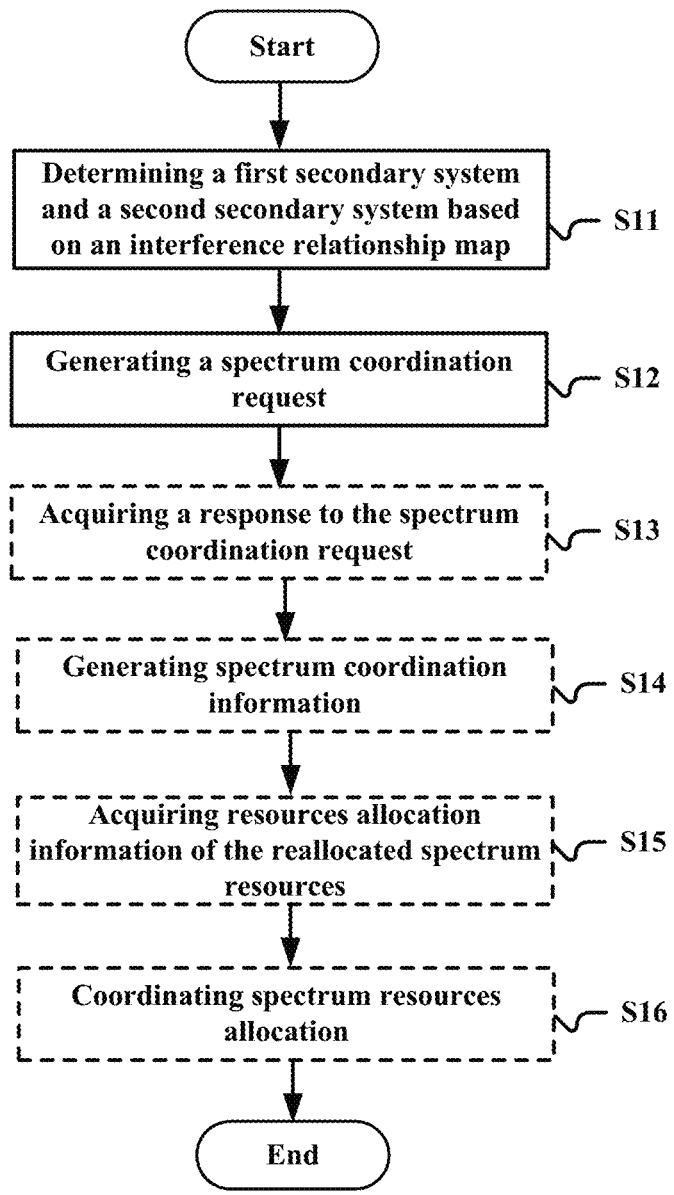
FIG. 7 shows a flow chart of a method for wireless communications according to an embodiment of the present disclosure.

FIG. 7 shows a flow chart of a method for wireless communications according to an embodiment of the present disclosure. The method includes: determining, based on information of interference relationship among secondary systems within a specific region, a second secondary system in a second coexistence group which has an interference relationship with a first secondary system in a first coexistence group (S11), the first coexistence group including secondary systems managed by a first spectrum management device, and the second coexistence group including secondary systems managed by a second spectrum management device; and generating a spectrum coordination request to be provided to the second spectrum management device (S12), the spectrum coordination request indicating that the first spectrum management device expects to coordinate utilization of spectrum resources with the second spectrum management device. The method may be performed on a side of the first spectrum management device (or a side of the central management device).

Although not shown in FIG. 7, the above method may further include a step of transmitting the spectrum coordination request to the second spectrum management device.

For example, the spectrum coordination request may include identification information of the first secondary system and the identification information of the second secondary system.

In addition, in step S11, a spectrum utilization freedom degree of the first secondary system may also be determined based on an interference relationship map. The spectrum utilization freedom degree indicates a degree to which the first secondary system is capable of freely selecting spectrum resources among the spectrum resources allocated to the coexistence group. As an example, the spectrum utilization freedom degree includes the number of manners for selecting spectrum resources which can be adopted by the first secondary system in a case that another secondary system in the first coexistence group utilizes the spectrum resources allocated to the first coexistence group.

A manner for coordinating utilization of the spectrum resources may be determined based on the spectrum utilization freedom degree of the first secondary system. The manner in which the first spectrum management device and the second spectrum management device coordinate the utilization of the spectrum resources includes one of the following: the second spectrum management device adjusting, based on spectrum resources allocation information of the first secondary system, spectrum resources allocation for the second secondary system; and the first spectrum management device adjusting, based on spectrum resources allocation information of the second secondary system, spectrum resources allocation for the first secondary system. Information indicating the determined manner for coordinating the utilization of the spectrum resources may be included in the spectrum coordination request.

In another example, information of the spectrum utilization freedom degree of the first secondary system may be included in the spectrum coordination request, so that the second spectrum management device determines the spectrum coordination manner based on the spectrum utilization freedom degree of the first secondary system and the spectrum utilization freedom degree of the second secondary system.

As shown in a dashed line block in FIG. 7, the method further includes a step S13 of acquiring a response to the spectrum coordination request from the second spectrum management device. The response includes one of the following: confirmation to the spectrum coordination request by the second spectrum management device, rejection to the spectrum coordination request by the second spectrum management device, and additional setting to the spectrum coordination request by the second spectrum management device. The additional setting to the spectrum coordination request by the second spectrum management device includes setting of the manner in which the first spectrum management device and the second spectrum management device coordinate the utilization of the spectrum resources.

As shown in another dashed line block in FIG. 7, the method may further include a step S14 of: in a case that the first spectrum management device and the second spectrum management device determine to coordinate spectrum resources allocation, generating spectrum coordination information to be provided to a third spectrum management device configured to allocate spectrum resources for the secondary systems within a specific region, the spectrum coordination information indicating that the first spectrum management device and the second spectrum management device are to coordinate the utilization of spectrum resources.

The method further includes a step S15 of acquiring, from the third spectrum management device, resources allocation information of the spectrum resources reallocated for the first coexistence group and the second coexistence group by the third spectrum management device based on the spectrum coordination information, and allocating spectrum resources for the secondary systems in the first coexistence group based on the resources allocation information.

The method further includes a step S16: coordinating the spectrum resources allocation. Specifically, in a case that the first spectrum management device adjusts, based on information of spectrum resources allocation for the second secondary system, spectrum resources allocation for the first secondary system, the step includes: acquiring the information of spectrum resources allocation of the second secondary system from the second spectrum management device, and allocating spectrum resources for the secondary systems in the first coexistence group based on the information of the spectrum resources allocation. In a case that the second spectrum management device adjusts, based on information of spectrum resources allocation for the first secondary system, spectrum resources allocation for the second secondary system, the step includes: providing the information of spectrum resources allocation for the first secondary system to the second spectrum management device, so that the second spectrum management device allocates spectrum resources for the secondary systems in the second coexistence group based on the information of spectrum resources allocation.

Moreover, although not shown in the drawings, the method may further include: receiving a second spectrum coordination request transmitted from the second spectrum management device.

The second spectrum coordination request includes a spectrum utilization freedom degree of the second secondary system. The spectrum utilization freedom degree of the first secondary system may be compared with the spectrum utilization freedom degree of the second secondary system, and the manner in which the first spectrum management device and the second spectrum management device coordinate the utilization of the spectrum resources may be determined based on a comparison result. For example, a spectrum management device corresponding to a secondary system with a higher spectrum utilization freedom degree may be selected as the spectrum management device to adjust the spectrum resources allocation.

The method may further include: generating a response to the second spectrum coordination request. The response includes setting indicating a manner in which the first spectrum management device and the second spectrum management device coordinate the utilization of the spectrum resources. The response includes, for example, one of the following: confirmation to the second spectrum coordination request and rejection to the second spectrum coordination request.

It should be noted that, details of the above method are described in the first embodiment, and are not repeated herein.

Figure 8:
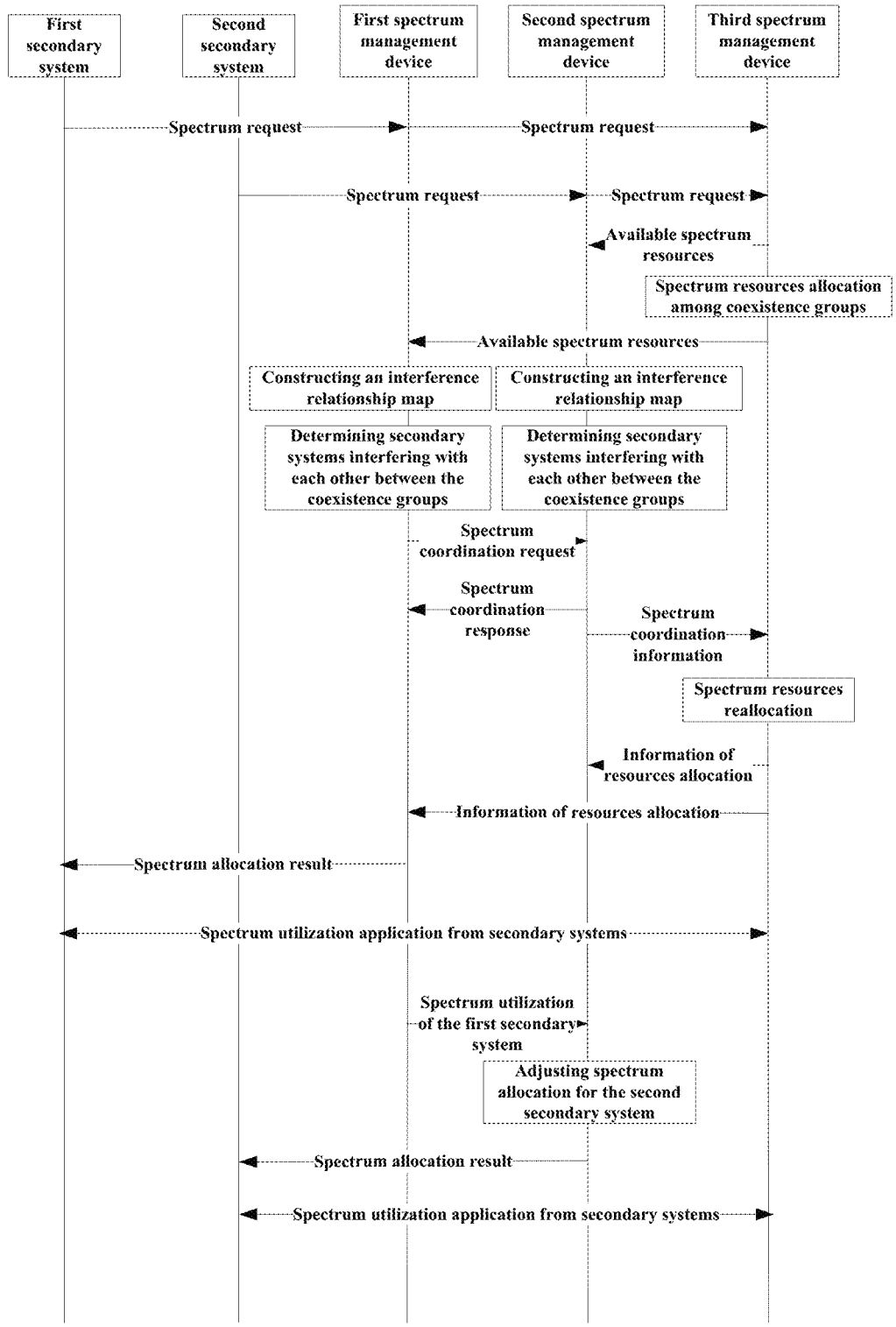
FIG. 8 shows an example of an information procedure between a secondary system and a spectrum management device.

For ease of understanding, FIG. 8 further shows a schematic diagram of the information procedure between a secondary system and a spectrum management device. It should be noted that, the information procedure is illustrative rather than restrictive.

In FIG. 8, the first secondary system is a secondary system in the first coexistence group managed by the first spectrum management device, and the second secondary system is a secondary system in the second coexistence group managed by the second spectrum management device. The first secondary system transmits a spectrum request to the first spectrum management device, and the second secondary system transmits a spectrum request to the second spectrum management device respectively. These spectrum requests are further transmitted to the third spectrum management device, which is configured to allocate available spectrum resources for secondary systems. For example, the first spectrum management device and the second spectrum management device each is a second-level spectrum management device such as a CxM, and the third spectrum management device is a first-level spectrum management device such as an SAS or GSC. Upon receipt of the spectrum requests, the third spectrum management device allocates spectrum resources among the coexistence groups, and provides information of available spectrum resources for each coexistence group to the first spectrum management device and the second spectrum management device respectively.

Next, the first spectrum management device and the second spectrum management device each construct an interference relationship map, and each determine a secondary system that has an interference relationship with a secondary system in the other coexistence group based on the interference relationship map. In this example, it is assumed that the first spectrum management device determines that the first secondary system and the second secondary system interfere with each other. Correspondingly, the first spectrum management device generates a spectrum coordination request and transmits the spectrum coordination request to the second spectrum management device. The spectrum coordination request includes identification information of the first secondary system, identification information of the second secondary system, and a spectrum utilization freedom degree of the first secondary system. Upon receipt of the spectrum coordination response, the second spectrum management device calculates a spectrum utilization freedom degree of the second secondary system, and compares the spectrum utilization freedom degree of the second secondary system with the spectrum utilization freedom degree of the first secondary system. In a case that that the spectrum utilization freedom degree of the second secondary system is greater than the spectrum utilization freedom degree of the first secondary system, the second spectrum management device determines itself to adjust the spectrum resources allocation, and includes this spectrum coordination manner into a spectrum coordination response to be transmitted to the first spectrum management device. The second spectrum management device further transmits the spectrum coordination information to the third spectrum management device. The spectrum coordination information indicates that the first spectrum management device and the second spectrum management device are to coordinate the utilization of spectrum resources. It should be noted that the spectrum coordination information may also be transmitted by the first spectrum management device to the third spectrum management device.

Upon receipt of the spectrum coordination information, the third spectrum management device re-divides the available spectrum resources and reallocates the re-divided available spectrum resources, and provides information of spectrum resources allocation to the first spectrum management device and the second spectrum management device. The first spectrum management device allocates the acquired available spectrum resources to the secondary systems in the first coexistence group. Each of secondary systems in the first coexistence group transmits a spectrum utilization application to the third spectrum management device and obtains authorization. In addition, based on the previously determined spectrum coordination manner, the first spectrum management device further transmits information of spectrum resources utilization of the first secondary system to the second spectrum management device. The second spectrum management device adjusts the spectrum resources allocation for the second secondary system based on the information of spectrum resources utilization, to ensure that the spectrum resources utilized by the second secondary system are orthogonal to the spectrum resources utilized by the first secondary system. Subsequently, the second spectrum management system transmits a spectrum resources allocation result to all secondary systems in the second coexistence group. Similarly, each of the secondary systems in the second coexistence group transmits a spectrum utilization application to the third spectrum management device and obtains authorization.

The technology of the present disclosure is applicable to various products.

For example, the electronic apparatus 100 may be implemented by any types of servers, such as a tower server, a rack server and a blade server. The electronic apparatus 100 may be a control module installed in a server (such as an integrated circuit module including a single chip, and a card or blade inserted into a slot of a blade server).

Application Example Regarding a Server

Figure 9:
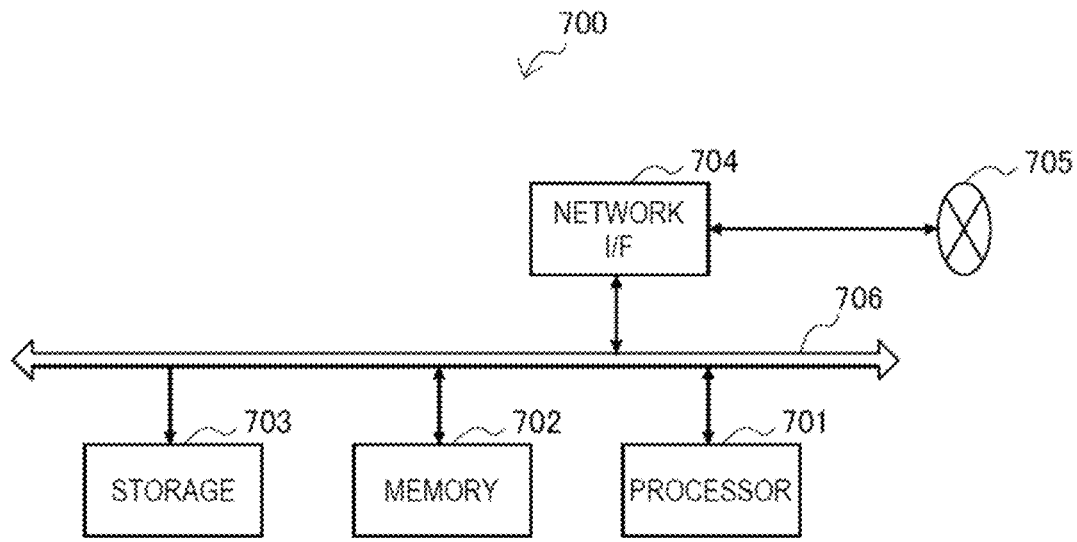
FIG. 9 is a block diagram showing an example of a schematic configuration of a server to which the technology of the present disclosure may be applied.

FIG. 9 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be, for example, a central processing unit (CPU) or a digital signal processor (DSP), and controls functions of the server 700. The memory 702 includes random access memory (RAM) and read only memory (ROM), and stores data and programs executed by the processor 701. The storage 703 may include a storage medium, such as a semiconductor memory and a hard disk.

The network interface 704 is a communication interface for connecting the server 700 to a communication network 705. The communication network 705 may be a core network such as an evolved packet core network (EPC) or a packet data network (PDN) such as the Internet.

The processor 701, the memory 702, the storage 703, and the network interface 704 are connected to each other via a bus 706. The bus 706 may include two or more buses (such as a high-speed bus and a low-speed bus) having different speeds.

In the server 700 shown in FIG. 9, the determination unit 101 and the generation unit 102 described with reference to FIG. 2, and the communication unit 103 described with reference to FIG. 3, and the like, may be implemented by the processor 701. For example, the processor 701 may coordinate the utilization of spectrum resources between two spectrum management devices by performing the functions of the determination unit 101, the generation unit 102 and the communication unit 103.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1000 shown in FIG. 10) from a storage medium or network, wherein the computer is capable of implementing various functions when installed with various programs.

Figure 10:
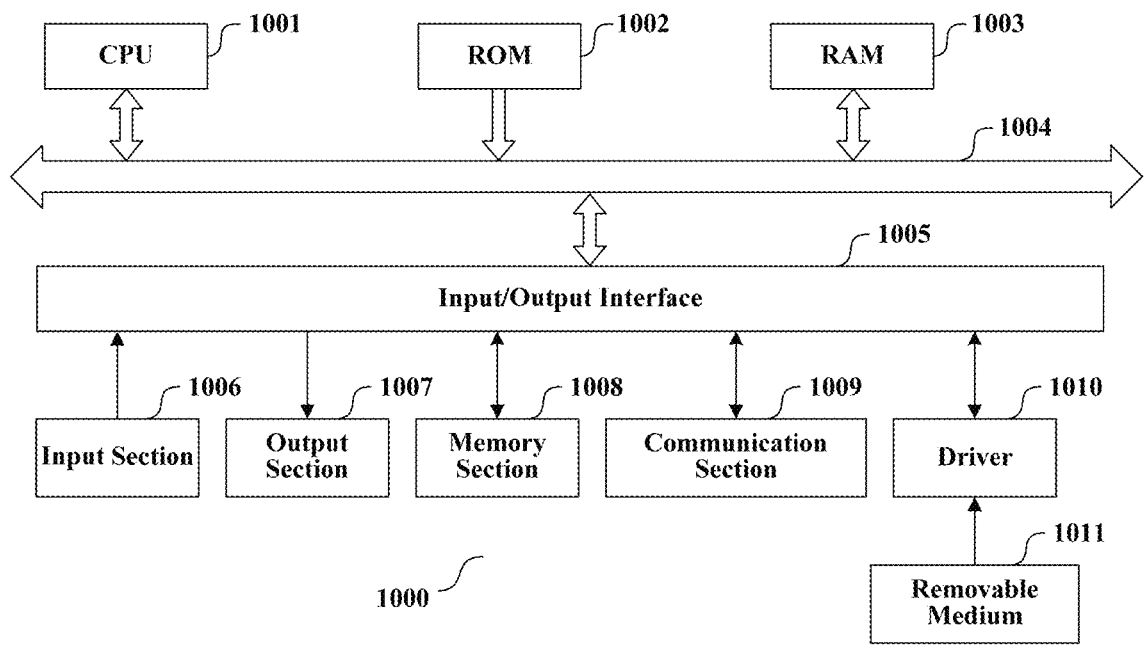
FIG. 10 is a block diagram of an exemplary block diagram illustrating the structure of a general purpose personal computer capable of realizing the method and/or device and/or system according to the embodiments of the present disclosure.

In FIG. 10, a central processing unit (CPU) 1001 executes various processing according to a program stored in a read-only memory (ROM) 1002 or a program loaded to a random access memory (RAM) 1003 from a memory section 1008. The data needed for the various processing of the CPU 1001 may be stored in the RAM 1003 as needed. The CPU 1001, the ROM 1002 and the RAM 1003 are linked with each other via a bus 1004. An input/output interface 1005 is also linked to the bus 1004.

The following components are linked to the input/output interface 1005: an input section 1006 (including keyboard, mouse and the like), an output section 1007 (including displays such as a cathode ray tube (CRT), a liquid crystal display (LCD), a loudspeaker and the like), a memory section 1008 (including hard disc and the like), and a communication section 1009 (including a network interface card such as a LAN card, modem and the like). The communication section 1009 performs communication processing via a network such as the Internet. A driver 1010 may also be linked to the input/output interface 1005, if needed. If needed, a removable medium 1011, for example, a magnetic disc, an optical disc, a magnetic optical disc, a semiconductor memory and the like, may be installed in the driver 1010, so that the computer program read therefrom is installed in the memory section 1008 as appropriate.

In the case where the foregoing series of processing is achieved through software, programs forming the software are installed from a network such as the Internet or a memory medium such as the removable medium 1011.

It should be appreciated by those skilled in the art that the memory medium is not limited to the removable medium 1011 shown in FIG. 10, which has program stored therein and is distributed separately from the apparatus so as to provide the programs to users. The removable medium 1011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1002 and the memory section 1008 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising: processing circuitry, configured to determine, based on information of interference relationship among secondary systems within a specific region, a second secondary system in a second coexistence group which has an interference relationship with a first secondary system in a first coexistence group, wherein the first coexistence group comprises secondary systems managed by a first spectrum management device, and the second coexistence, group comprises secondary systems managed by a second spectrum management device, determine, according to an interference relationship map, a spectrum utilization freedom degree of the first secondary system, wherein the spectrum utilization freedom degree of the first secondary system indicates a degree to which the first secondary system is capable of freely selecting spectrum resources among the spectrum resources allocated to the first coexistence group, and generate a spectrum coordination request to be provided to the second spectrum management device, the spectrum coordination request indicating that the first spectrum management device expects to coordinate utilization of spectrum resources with the second spectrum management device.

2. The electronic apparatus according to claim 1, wherein the spectrum coordination request comprises identification information of the first secondary system and identification information of the second secondary system.

3. The electronic apparatus according to claim 1, wherein the spectrum utilization freedom degree comprises: the number of manners for selecting spectrum resources which can be adopted by the first secondary system in a case that another secondary system in the first coexistence group utilizes the spectrum resources allocated to the first coexistence group.

4. The electronic apparatus according to claim 1, wherein the processing circuitry is further configured to comprise information of the spectrum utilization freedom degree in the spectrum coordination request.

5. The electronic apparatus according to claim 1, wherein a manner in which the first spectrum management device and the second spectrum management device coordinate the utilization of the spectrum resources comprises one of the following: the second spectrum management device adjusting, based on spectrum resources allocation information of the first secondary system, spectrum resources allocation for the second secondary system; and the first spectrum management device adjusting, based on spectrum resources allocation information of the second secondary system, spectrum resources allocation for the first secondary system.

6. The electronic apparatus according to claim 5, wherein the spectrum coordination request comprises information indicating a manner of coordinating utilization of the spectrum resources that is determined by the first spectrum management device.

7. The electronic apparatus according to claim 5, wherein the processing circuitry is configured to determine, based on a spectrum utilization freedom degree of the first secondary system, a manner of coordinating utilization of the spectrum resources that is to be adopted, the spectrum utilization freedom degree indicating a degree to which the first secondary system is capable of freely selecting spectrum resources among the spectrum resources allocated to the first coexistence group.

8. The electronic apparatus according to claim 1, wherein the processing circuitry is further configured to acquire, from the second spectrum management device, a response to the spectrum coordination request.

9. The electronic apparatus according to claim 8, wherein the response comprises one of the following: confirmation to the spectrum coordination request by the second spectrum management device, rejection to the spectrum coordination request by the second spectrum management device, and additional setting to the spectrum coordination request by the second spectrum management device.

10. The electronic apparatus according to claim 9, wherein the additional setting to the spectrum coordination request by the second spectrum management device comprises setting of a manner in which the first spectrum management device and the second spectrum management device coordinate the utilization of the spectrum resources.

11. The electronic apparatus according to claim 1, wherein the processing circuitry is further configured to receive a second spectrum coordination request sent by the second spectrum management device.

12. The electronic apparatus according to claim 11, wherein the second spectrum coordination request comprises a spectrum utilization freedom degree of the second secondary system, and the processing circuitry is configured to compare the spectrum utilization freedom degree of the first secondary system with the spectrum utilization freedom degree of the second secondary system, and determine, based on a comparison result, a manner in which the first spectrum management device and the second spectrum management device coordinate the utilization of the spectrum resources.

13. The electronic apparatus according to claim 12, wherein, the processing circuitry is configured to select a spectrum management device corresponding to a secondary system with a higher spectrum utilization freedom degree as a spectrum management device which is to perform adjustment of spectrum resources allocation.

14. The electronic apparatus according to claim 12, wherein the processing circuitry is further configured to generate a response to the second spectrum coordination request, wherein the response comprises setting indicating a manner in which the first spectrum management device and the second spectrum management device coordinate the utilization of the spectrum resources.

15. The electronic apparatus according to claim 11, wherein the processing circuitry is further configured to generate a response to the second spectrum coordination request, wherein the response comprises one of the following: confirmation to the second spectrum coordination request, and rejection to the second spectrum coordination request.

16. The electronic apparatus according to claim 8, wherein the processing circuitry is configured to: in a case that the first spectrum management device and the second spectrum management device determine to coordinate utilization of spectrum resources, generate spectrum coordination information to be provided to a third spectrum management device which is configured to allocate spectrum resources for the secondary systems within the specific region, wherein the spectrum coordination information indicates that the first spectrum management device and the second spectrum management device are to coordinate the utilization of spectrum resources.

17. The electronic apparatus according to claim 16, wherein, the processing circuitry is further configured to: acquire, from the third spectrum management device, resources allocation information of the spectrum resources reallocated for the first coexistence group and the second coexistence group by the third spectrum management device based on the spectrum coordination information, and allocate spectrum resources for the secondary systems in the first coexistence group based on the resources allocation information.

18. The electronic apparatus according to claim 5, wherein, in a case that the first spectrum management device adjusts, based on the information of spectrum resources allocation of the second secondary system, spectrum resources allocation for the first secondary system, the processing circuitry is further configured to acquire, from the second spectrum management device, the information of spectrum resources allocation for the second secondary system, and allocate spectrum resources for the secondary systems in the first coexistence group according to the information of spectrum resources allocation, and wherein, in a case that the second spectrum management device adjusts, based on information of spectrum resources allocation for the first secondary system, spectrum resources allocation for the second secondary system, the processing circuitry is further configured to provide the information of spectrum resources allocation of the first secondary system to the second spectrum management device, so that the second spectrum management device allocates spectrum resources for the secondary systems in the second coexistence group according to the information of spectrum resources allocation.

19. A method for wireless communications, comprising:
determining, based on information of interference relationship among secondary systems within a specific region, a second secondary system in a second coexistence group which has an interference relationship with a first secondary system in a first coexistence group, wherein the first coexistence group comprises secondary systems managed by a first spectrum management device, and the second coexistence group comprises secondary systems managed by a second spectrum management device;
determining, according to an interference relationship map, a spectrum utilization freedom degree of the first secondary system, wherein the spectrum utilization freedom degree of the first secondary system indicates a degree to which the first secondary system is capable of freely selecting spectrum resources among the spectrum resources allocated to the first coexistence group; and
generating a spectrum coordination request to be provided to the second spectrum management device, the spectrum coordination request indicating that the first spectrum management device expects to coordinate utilization of spectrum resources with the second spectrum management device.

* * * * *